United States Patent [19]

Ishikawa et al.

[11] 4,197,103
[45] Apr. 8, 1980

[54] METHOD FOR DRAW FORMING GLASS FIBERS

[75] Inventors: Masaru Ishikawa; Takeshi Watanabe; Masaaki Takita; Shinsuke Shikama; Kazuo Nishimaki, all of Fukushima, Japan

[73] Assignee: Nitto Boseki Co., Ltd., Fukushima, Japan

[21] Appl. No.: 825,113

[22] Filed: Aug. 16, 1977

[30] Foreign Application Priority Data

Aug. 16, 1976 [JP] Japan .................................. 51-97543

[51] Int. Cl.² ............................................. C03B 37/02
[52] U.S. Cl. .............................................. 65/2; 65/5; 65/12
[58] Field of Search .............................. 65/2, 5, 12, 16

[56] References Cited

U.S. PATENT DOCUMENTS

| | | | |
|---|---|---|---|
| 2,908,036 | 10/1959 | Russell | 65/12 |
| 3,404,163 | 2/1967 | Holschlag | 65/12 X |
| 3,695,858 | 10/1972 | Russell | 65/12 X |
| 3,905,790 | 9/1975 | Strickland | 65/2 |
| 3,969,099 | 7/1976 | Reese | 65/12 X |

Primary Examiner—Robert L. Lindsay, Jr.
Attorney, Agent, or Firm—Sughrue, Rothwell, Mion, Zinn and Macpeak

[57] ABSTRACT

An apparatus for draw forming glass filaments includes a melt furnace 1 having a bottom plate 12 with a plurality of flow holes therein, each terminating in a conical nozzle tip 2. Cooling fins 10 extend outwardly from a water pipe 11 and are disposed between the rows of tips, and additional cooling is provided at least during the initial start-up period by air blown across the nozzle tips from a manifold 13 disposed opposite the water pipe. With such an arrangement the flow hole diameters may be increased, which results in an exponential increase in the molten glass flow rate and filament production rate, while still achieving smooth initial and stable continuous filament forming conditions.

6 Claims, 4 Drawing Figures

METHOD FOR DRAW FORMING GLASS FIBERS

BACKGROUND OF THE INVENTION

This invention relates to an improved method and apparatus for draw forming glass fibers at increased winding and production speeds.

Early glass fiber draw forming melt furnaces employed a flat nozzle plate made of platinum-rhodium alloy having a plurality of holes drilled therein approximately 1.5–3 mm in diameter. The outer bottom of such a nozzle plate has a strong tendency to become wetted by the molten glass flowing through the holes, however, and if the pitch of or spacing between the nozzle holes is made smaller to increase the hole density and production rate, and one of the running filaments is broken off, the molten glass cone formed at the nozzle exit is likely to spread across the surface of the nozzle plate. As a result, the filaments being drawn through the adjacent nozzle holes are also cut off, and this phenomenon can easily spread in a progressive manner until finally all of the filaments are cut off and the nozzle plate surface is completely covered with molten glass. If this happens it is extremely difficult to restore satisfactory forming conditions in which the molten glass filaments remain separated, and a costly shutdown and restart operation may be required.

Conical nozzle tips have been developed to overcome this difficulty, wherein the area wetted by the molten glass flowing out of a nozzle is limited to the bottom surface of the tip. The molten glass from one nozzle tip cannot "flow uphill", and thus cannot contact the molten glasses from other nozzle tips, whereby the running filaments are forced to flow separately and the nozzle spacing can be reduced to increase productivity. Limitations still exist, however, since if the tips are too close to one another the molten glass may flow into the recesses between them by capillary action, which again disrupts the forming conditions. Furthermore, it is advantageous to provide cooling fins between the tips to improve productivity, and this creates an additional tip density limitation. At the present time, for example, it is not practical for the distance between adjacent nozzle tip peripheries to be less than 4.0 mm.

The flow rate of molten glass through a passage is defined by Hagen-Poiseuille's equation as follows:

$$Q = K(\rho \pi \Delta P \, d^4 / \eta L),$$

where
- $Q$: flow rate per unit time,
- $K$: proportional constant,
- $\rho$: density of the glass,
- $\Delta P$: difference in pressure between the ends of the passage,
- $d$: diameter of the passage,
- $\eta$: viscosity of the molten glass, and
- $L$: length of the passage.

As is apparent from the above equation, there are four ways to increase the flow rate of the molten glass. A first is to increase $\Delta P$ by increasing the quantity of molten glass in the furnace and/or by exerting pressure on the molten glass surface. Increasing the quantity of molten glass requires a larger furnace and an attendant increase in fuel expense to maintain the melt temperature, however, and the furnace must be made air-tight before pressure can be applied to the molten glass surface which makes the construction of the apparatus unduly intricate.

A second method is to reduce the viscosity value $\eta$ of the molten glass by raising its temperature. This increases the fuel expense, however, and also disrupts the stability of the filament forming operation.

A third method is to decrease the value $L$ by shortening the length of the nozzle tips, but this expedient increases the surface wetting tendency and necessitates a lower hole density to offset such tendency.

A fourth method involves increasing the diameter $d$ of the nozzle tips, and the present invention is concerned with this expedient and with a technique for implementing a smooth and reliable filament forming start-up operation in combination therewith.

FIGS. 1 and 2 show a conventional glass fiber draw forming apparatus wherein molten glass in a melt furnace 1 flows out of nozzle tips 2 to form glass cones which in turn are drawn out into glass fibers or filaments 3. The filaments are coated with a collecting agent at a roller station 4, gathered into a single strand 6 by a roller device 5, and evenly wound on a bobbin 9 mounted on a winding stand 8 by a reciprocating guide device 7. Reference numeral 10 designates cooling fins extending between adjacent rows of nozzle tips 2, with one end of each fin being attached to a manifold pipe 11 through which a cooling agent, such as water, is pumped.

There are two methods of increasing the nozzle tip diameters, one in which the diameters are simply enlarged without changing the number of nozzle tips per unit area, i.e. hole density, and another in which the diameters are increased while maintaining the same spacing or distance between adjacent nozzle tip peripheries. In either method the molten glass flow rate per unit time, as seen from the equation, increases in proportion to the fourth power of the diameter. The molten glass cones formed at the ends of the nozzle tips thus grow quickly in size as the tip diameters are increased, and as a result the cooling effect on the cones by heat radiation to the surrounding atmosphere decreases and their temperature rises, in spite of the cooling effect provided by the fins. It thus becomes impossible to reduce the temperature of the glass from its molten level of 1300°–1400° C. in the furnace to a suitable filament forming level of 1100°–1300° C., which disrupts or disables filament formation, causes filament breakage, non-uniform filament diameters, etc. To study this phenomenon quantitatively, the distance between adjacent nozzle tips was set at 4.2 mm and the diameter of each hole was gradually increased. It was found that at molten glass flow rates of less than 0.5 g/min/nozzle, steady filament formation and continuous operation could be achieved by conventional methods. If the flow rate was increased to between 0.5 and 0.55 g/min, however, instability and non-uniformity began to occur, and above 0.55 g/min the initial filament formation and continuous operation thereafter could no longer be effected.

SUMMARY OF THE INVENTION

It is therefore an object of the present invention to provide an improved method and apparatus for producing glass fibers by suitably modifying a conventional draw forming apparatus to achieve greatly increased production rates. Specifically, and according to the present invention, the flow hole diameters in the nozzle plate are increased while maintaining the same spacing between adjacent nozzle tip peripheries, and cooling air is blown across the nozzle tips from a supply manifold in a direction parallel to the cooling fins at least during the initial start-up period of the filament forming operation. After stabilized filament forming conditions have been reached, usually within 5–10 seconds, the air flow is reduced or terminated. Continuous filament withdrawal and winding can be maintained thereafter at a molten glass flow rate of at least 0.75 g/min/nozzle, whereby the glass fiber productivity rate is markedly increased.

DETAILED DESCRIPTION OF THE INVENTION

Figure 1:
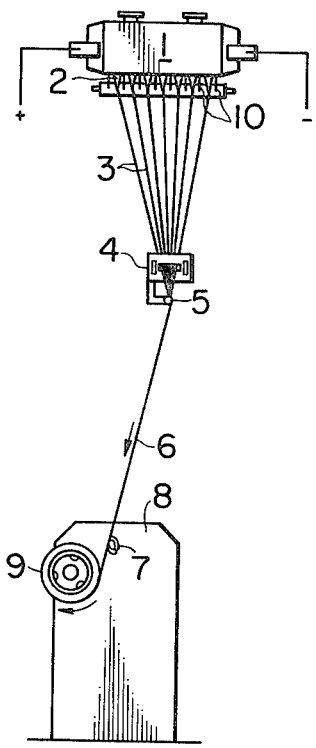
FIG. 1 shows a schematic elevation of a conventional glass fiber forming apparatus employing nozzle tips and cooling fins.
Figure 2:
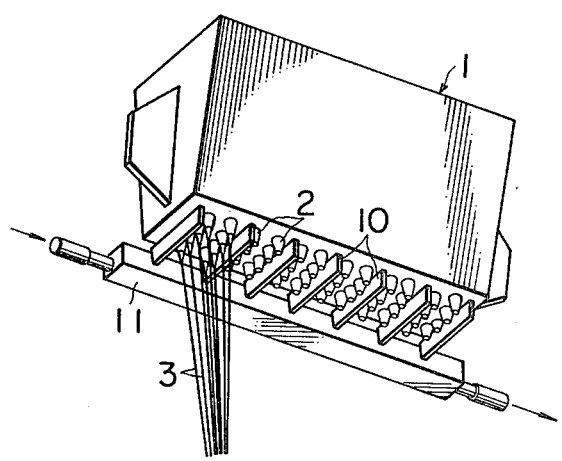
FIG. 2 shows a perspective view, as seen from below, of the forming furnace of FIG. 1.
Figure 3:
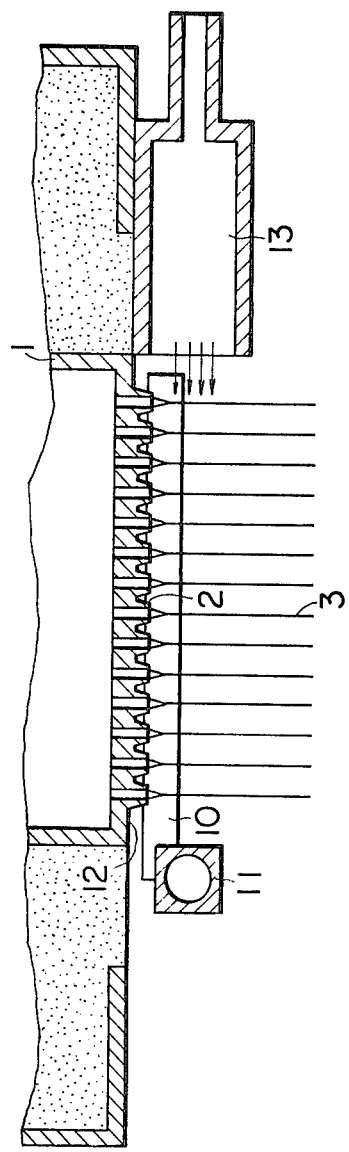
FIG. 3 shows a cross-sectional view of the nozzle tips of a forming furnace, including an air blower manifold for practicing the present invention.
Figure 4:
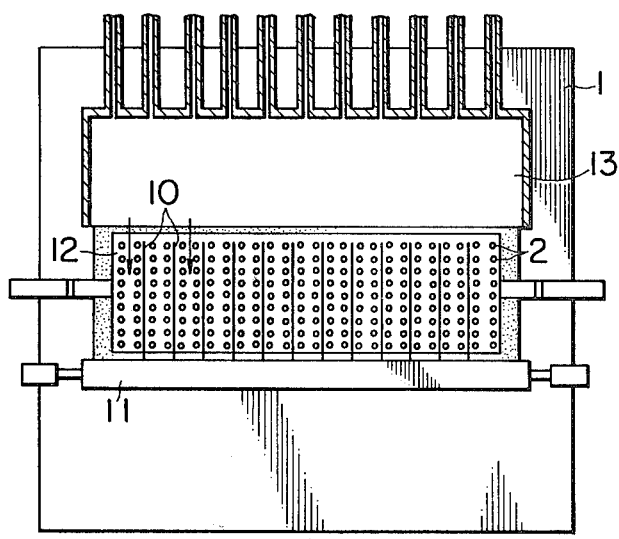
FIG. 4 shows a bottom view of the forming furnace of FIG. 3, partly in section.

During the development of this invention studies have been made on various ways to increase the filament forming rate and efficiency, and it has been found that steady filament forming or withdrawal conditions can be realized at rates up to at least 0.75 grams of molten glass/minute/nozzle if a suitable supplementary coolant, such as air, is blown across the nozzles during at least the initial or start-up period of the flow forming operation. Such air may be delivered through a duct or manifold 13, for example, as shown in FIGS. 3 and 4, disposed adjacent to and just below the nozzle tip surface 12 of the furnace 1. More specifically, by blowing air across the nozzles immediately before and during the commencement of the forming operation, the cooling of the fins, the nozzle tips and the flass cones is enhanced or increased. After the filament withdrawal and winding operations become steady or stabilized, the cooling air flow may be suspended, whereby continuing steady operation is maintained by both the cooling fins and the cooling effect of the air flow inherently generated by the running filaments. To draw form filaments having the same final diameter regardless of an increase in the nozzle tip diameters, it is necessary to increase the winding rate in proportion to the nozzle diameter increase or molten glass flow rate increase. Accordingly, as the diameter of the nozzle tips is increased the rate of the air flow generated by the faster running filaments correspondingly increases, as a result of which sufficient cooling is continuously provided. Thus, the glass fiber production quantity per unit time can be increased in proportion to the filament winding speed.

According to experimental results, in a forming furnace having approximately 800 nozzle tips steady filament withdrawal conditions can be achieved by using an initial cooling air flow rate of from 0.7 to 1.8 m$^3$/min at a velocity of from 0.6 to 1.5 m/sec, for a period of from 5 to 10 seconds from the start of the forming operation. When the duct 13 is arranged opposite to and confronting the cooling water pipe 11 to which the fins 10 are connected, as shown in FIGS. 3 and 4, there may be a temperature difference between the base portions of the fins and their ends or extremities which may cause fluctuations in the cooling effects of the nozzles. In such case the air flow need not be completely stopped after the winding operation has become stabilized, but instead may be reduced to a relatively low level whereby the cooling fin temperatures will be uniform throughout their lengths.

The invention will now be further described by referring to specific but non-limiting examples wherein the number of nozzle tips in 800, the distance between adjacent nozzle tips is 4.2 mm, and the diameter of the resultant glass fibers is 10$\mu$.

EXAMPLE 1

The diameter of each nozzle tip was initially 1.80 mm, and the total molten glass flow rate was 300 g/min. The winding rate was set at 1900 m/min to form flass fibers 10$\mu$ in diameter. The forming was carried out using a conventional furnace having cooling fins but without any additional or auxiliary cooling means. Filament forming could be carried out steadily and continuously. The diameter of each nozzle tip was then increased to 1.92 mm, and as a result the molten glass flow rate increased to 400 g/min. With such a flow rate the winding speed had to be increased to 2500 m/min to form glass fibers 10$\mu$ in diameter. The forming was again carried out using a conventional furnace with cooling fins but without any auxiliary cooling means, and it was found difficult to achieve stable forming conditions. Next, an air flow was supplied across the nozzle tip surface in a direction parallel to the rows of cooling fins at a rate of 0.7 m$^3$/min and a velocity of 0.6 m/sec until the forming and winding operation became steady, which took approximately 5 seconds. The air flow was thereafter suspended, and the forming and winding conditions remained steady and continuous.

EXAMPLE 2

The diameter of each nozzle tip was increased to 2.00 mm, which increased the molten glass flow rate to 450 g/min. With such a flow rate the winding speed had to be increased to 2800 m/min to form glass fibers 10$\mu$ in diameter. In this case the initial filament formation could not be achieved without the supply of cooling air, and a flow rate of 0.9 m$^3$/min at a velocity of 0.8 m/sec was thus employed for about 5 seconds after the start of the glass flow, and was then suspended. The filament formation remained steady and continuous.

EXAMPLE 3

The diameter of each nozzle tip was increased to 2.05 mm, which increased the molten glass flow rate to 500 g/min. This required the winding speed to be increased to 3100 m/min to form glass fibers 10$\mu$ in diameter. The initial cooling air was supplied at a flow rate of 1.2 m$^3$/min and a velocity of 1.0 m/sec for approximately seven seconds after the commencement of the glass flow, and was then suspended. Stable filament formation continued thereafter.

EXAMPLE 4

The diameter of each nozzle tip was increased to 2.15 mm, which increased the molten glass flow rate to 600 g/min. This required the winding speed to be increased to 3800 m/min to form glass fibers 10$\mu$ in diameter. The initial cooling air was supplied at a flow rate of 1.8 m$^3$/min and a velocity of 1.5 m/sec for ten seconds after the molten glass began to flow, and was then suspended.

Again, a steady and continuous filament forming operation was maintained.

What claimed is:

1. In a method of draw forming glass filaments wherein molten glass in a melt furnace passes through a plurality of flow holes in the bottom of the furnace aligned in rows and each terminating in a downwardly extending nozzle tip to form a plurality of molten glass cones at each nozzle tip exit which are drawn down into separate glass filaments, and wherein cooling fins are individually disposed between adjacent nozzle tip rows to cool the molten glass cones, the improvements characterized by:
   (a) increasing the diameter of each flow hole to such an extent that the molten glass flow rate exceeds 0.5 grams per minute per nozzle tip while maintaining a sufficient spacing between adjacent nozzle tip peripheries to prevent the molten glass from flowing into the upwardly extending recesses therebetween, and
   (b) blowing a flow of cooling air across the nozzle tips in a direction parallel to the cooling fins, only during start-up, during the initial start-up period of the filament draw forming operation.

2. A method as defined in claim 1, wherein the cooling air is blown across the nozzle tips for a period of from 5-10 seconds, and is thereafter terminated.

3. A method as defined in claim 1, wherein the cooling air is blown across the nozzle tips for a period of from 5-10 seconds, and is thereafter reduced.

4. A method as defined in claim 1, wherein the flow hole diameters are increased to such an extent that the molten glass flow rate is from 0.55-0.75 grams/minute/nozzle tip.

5. A method as defined in claim 2, wherein the flow hoe diameters are increased to such an extent that the molten glass flow rate is from 0.55-0.75 grams/minute/nozzle tip.

6. A method as defined in claim 3, wherein the flow hole diameters are increased to such an extent that the molten glass flow rate is from 0.55-0.75 grams/minute/nozzle tip.

* * * * *